United States Patent
Hickcox, III

(12) 
(10) Patent No.: US 12,304,330 B1
(45) Date of Patent: May 20, 2025

(54) ELECTRIC OUTBOARD MOTOR

(71) Applicant: Charles B. Hickcox, III, Jacksonville, NC (US)

(72) Inventor: Charles B. Hickcox, III, Jacksonville, NC (US)

( * ) Notice: Subject to any disclaimer, the term of this patent is extended or adjusted under 35 U.S.C. 154(b) by 588 days.

(21) Appl. No.: 17/673,364

(22) Filed: Feb. 16, 2022

(51) Int. Cl.
| | |
|---|---|
| *B60L 50/70* | (2019.01) |
| *B63H 20/28* | (2006.01) |
| *B63H 20/32* | (2006.01) |
| *B63H 23/06* | (2006.01) |
| *B63H 23/34* | (2006.01) |

(52) U.S. Cl.
CPC .............. *B60L 50/70* (2019.02); *B63H 20/28* (2013.01); *B63H 20/32* (2013.01); *B63H 23/06* (2013.01); *B63H 23/34* (2013.01); *B60L 2200/32* (2013.01)

(58) Field of Classification Search
CPC ..... B60L 50/70; B60L 2200/32; B63H 20/28; B63H 20/32; B63H 23/06; B63H 23/34
See application file for complete search history.

(56) References Cited

U.S. PATENT DOCUMENTS

| | | | |
|---|---|---|---|
| 7,018,249 B2 | 3/2006 | Ries et al. | |
| 7,249,984 B2 * | 7/2007 | Kobayashi | H01M 8/04201 440/6 |
| 10,618,617 B2 | 4/2020 | Suzuki et al. | |
| 10,940,926 B2 * | 3/2021 | Sako | H01M 10/0525 |

FOREIGN PATENT DOCUMENTS

| | | | |
|---|---|---|---|
| JP | 2015196408 A | * | 11/2015 |
| JP | 2022106233 A | * | 7/2022 |

* cited by examiner

*Primary Examiner* — Anthony D Wiest
(74) *Attorney, Agent, or Firm* — Sanchelima & Associates, P.A.; Jesus Sanchelima; Christian Sanchelima

(57) ABSTRACT

An electric outboard motor including a housing assembly, a propeller assembly, a fuel cell assembly, a cooling assembly and a boat assembly. The housing assembly includes a housing having a shape of an electric outboard marine motor. The propeller assembly includes a propeller mechanically connected to an electric motor. The electric motor is enclosed by the housing. The fuel cell assembly includes a fuel cell, and an electronic control unit. The fuel cell powers the electric motor. A fuel tank of the boat assembly provides fuel to the fuel cell. The electronic control unit controls the operation of the fuel cell and a battery. The fuel cell and the electronic control unit are enclosed by the housing. The cooling assembly includes a cooling sleeve surrounding the motor to prevent overheating.

8 Claims, 4 Drawing Sheets

ELECTRIC OUTBOARD MOTOR

BACKGROUND OF THE INVENTION

1. Field of the Invention

The present invention relates to electric outboard motors and, more particularly, to an electric outboard motor that is powered by a hydrogen cell.

2. Description of the Related Art

Several designs for electric outboard motors have been designed in the past. None of them, however, include a single outboard motor unit including a housing to enclose and electric motor and a hydrogen fuel cell.

Applicant believes that a related reference corresponds to U.S. Pat. No. 7,018,249 issued for a boat propulsion system that includes an electric motor that drives a propeller and a power supply unit with a heat transfer system. Applicant believes that another related reference corresponds to U.S. Pat. No. 10,618,617 issued for an electric marine propulsion unit. None of these references, however, teach of an electric outboard marine motor comprising a housing enclosing a hydrogen fuel cell, an electronic control unit and an electric motor.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an electric outboard motor that includes a fuel cell to power the electric motor avoiding the pollution of combustion motors and avoiding the weight of batteries to power the electric motor.

It is another object of this invention to provide an electric outboard motor that includes a cooling system to avoid overheating of the electric motor.

It is still another object of the present invention to provide an electric outboard motor enclosed in a single outboard motor unit that can be retrofitted into any existent hulls.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
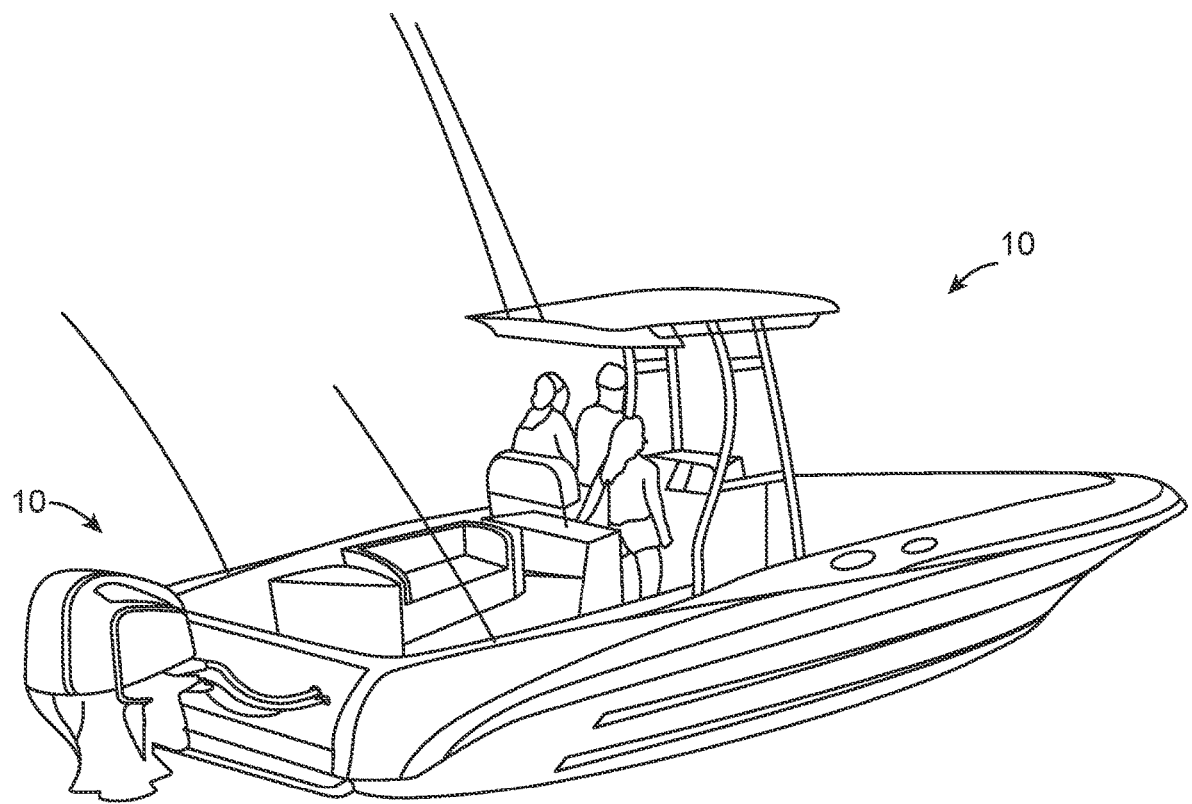
FIG. 1 represents an operational isometric view of the present invention 10 mounted to a boat.
Figure 2:
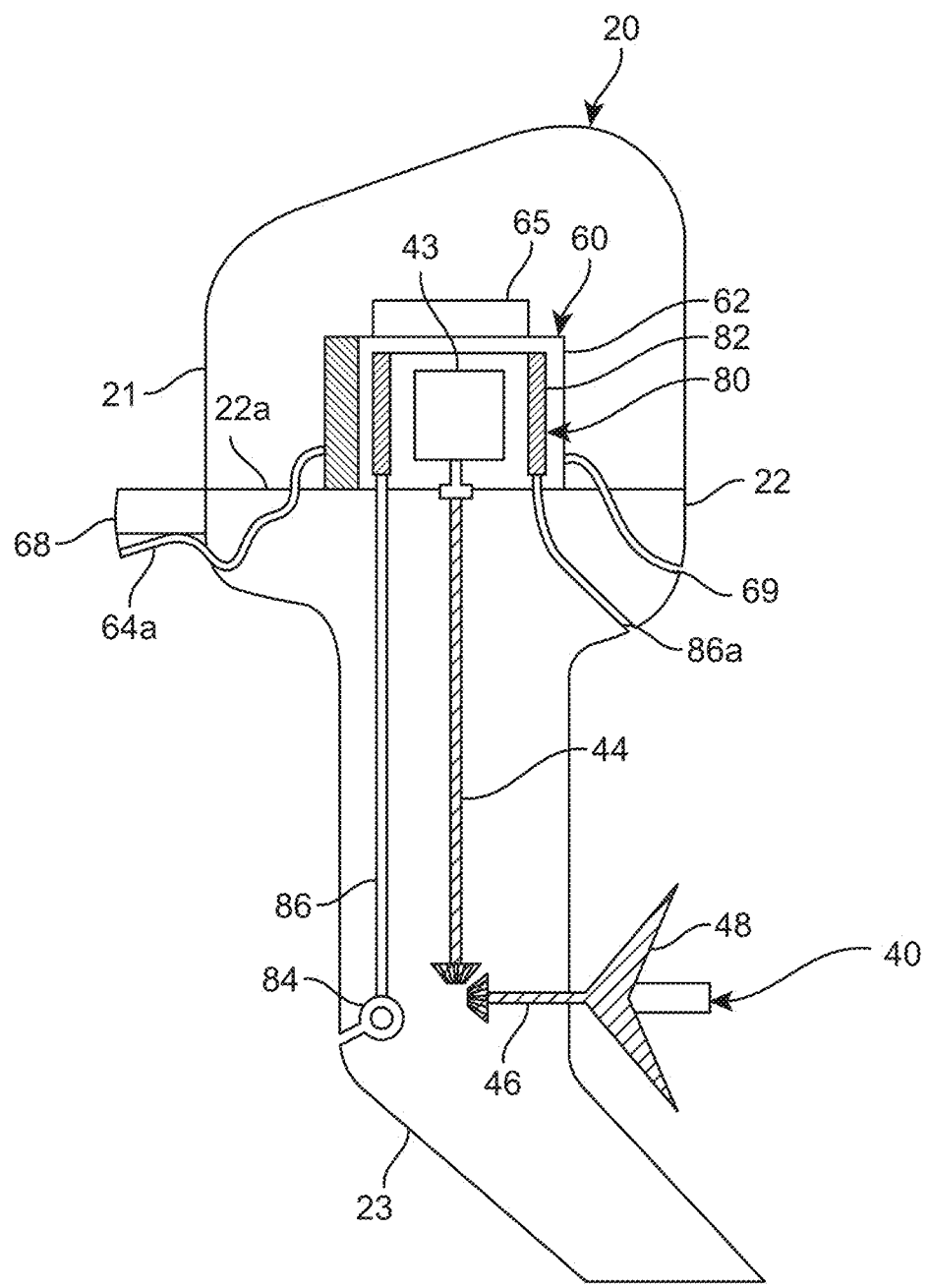
FIG. 2 shows a cross sectional view of one of the preferred embodiments of the present invention 10 showing the fuel cell 62 housed by housing assembly 20. The cooling sleeve 82 surrounds the motor 43.
Figure 3:
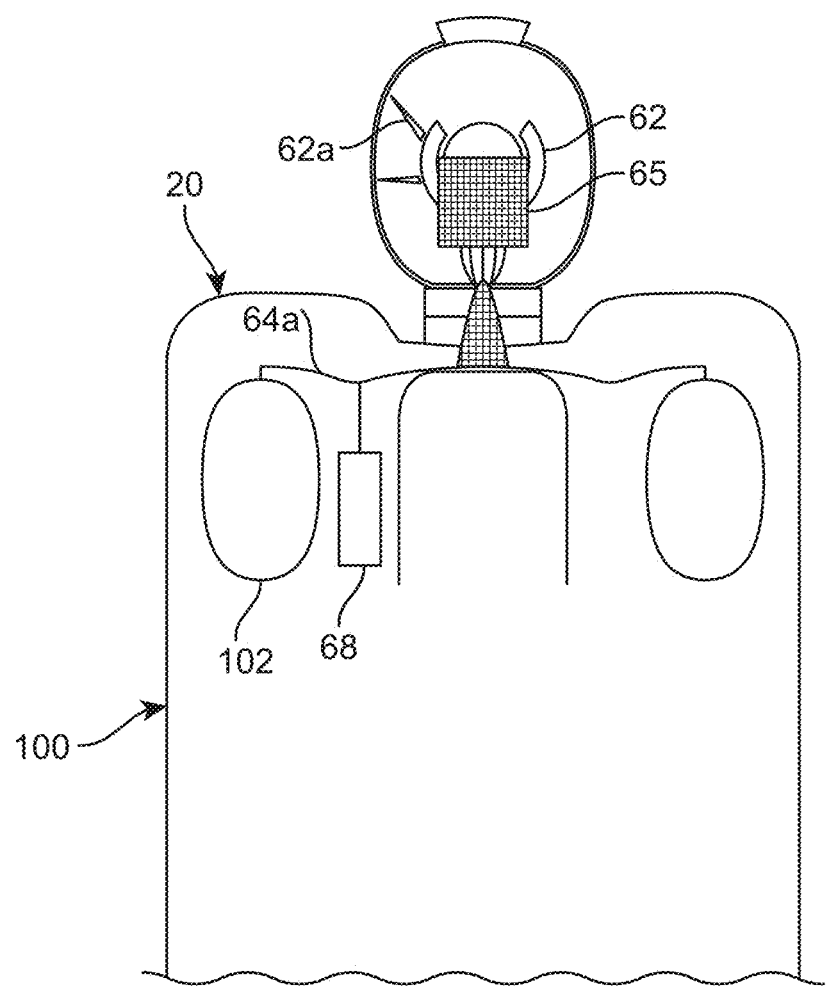
FIG. 3 illustrates a top see through view of the present invention showing the tanks 102 and the battery 68 with tank pipe 64a being the fuel line.
Figure 4:
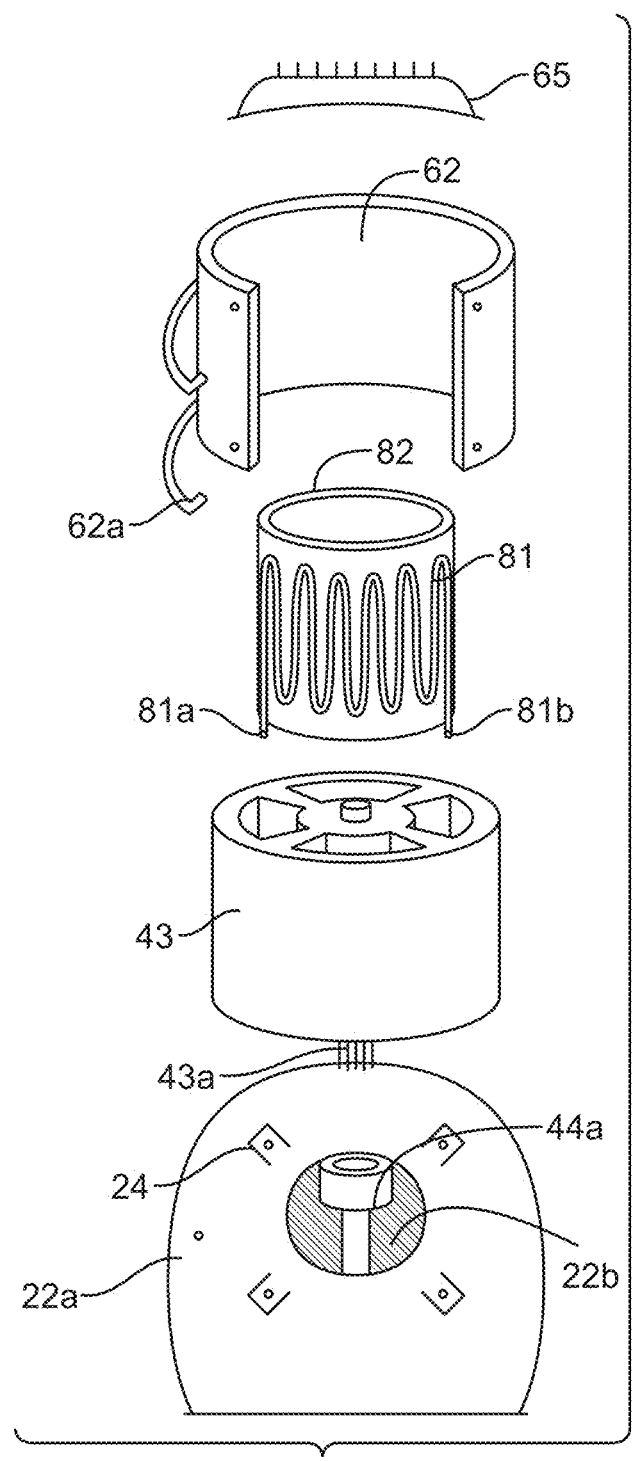
FIG. 4 is a representation of a partially exploded view of the present invention 10 showing the motor 43, the cooling sleeve 82 and the fuel cell 62.

Referring now to the drawings, where the present invention is generally referred to with numeral 10, it can be observed that it basically includes housing assembly 20, propeller assembly 40, a fuel cell assembly 60, a cooling assembly 80 and a boat assembly 100. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Housing assembly 20 may include an upper portion 21, a middle portion 22 and a lower portion 23. The upper portion 21 may be hollow. The upper portion 21 may have four walls connected one to each other defining a rectangular base with rounded corners. A rear wall of the four walls may be higher than a front wall of the four walls. The four walls of the upper portion 21 may have a top wall connected therein. The top wall may be rounded with planar portions. The middle portion 22 may have a first portion that tappers inwardly and a second portion that is substantially straight. The first portion of the middle portion 22 may be connected to the upper portion 21. The middle portion 22 may include a support wall 22a located in the first portion. The support wall 22a may have an opening 22b located about a central portion of the support wall 22a. In one embodiment, the opening 22b may have a circular shape. It should be understood that the opening 22b may have any other suitable shape. The support wall 22a may further include fasteners 24. Fasteners 24 may be any suitable fastener known in the prior art. Fasteners 24 may be located proximal to the opening 22b. The lower portion 23 may be connected to the middle portion 22. The lower portion 23 may be a skeg. The housing assembly 20 may be made of an engineering material. The housing assembly 20 may be made or include a coating of a material that is resistant against corrosion. The housing assembly 20 may have a shape of any outboard motor known in the prior art. The housing assembly 20 may be retrofitted with the fuel cell assembly 60. It also may be suitable to manufacture the housing assembly 20 specially designed to have the fuel cell assembly 60. It should be noted that the housing assembly 20 may include all the generic components of an outboard motor as known in the prior art. The housing assembly 20 may be mounted to the boat assembly 100. The boat assembly 100 may have a fuel tank 102 mounted thereon onboard. Preferably the fuel tank 102 may be filled with hydrogen.

The propeller assembly 40 may include a motor 43 transmission shaft 44, a propeller shaft 46 and a propeller 48. The transmission shaft 44 may include an elongated rod member. In a preferred embodiment, a lower distal end of the transmission shaft 44 may include a first bevel gear. It should be understood that the transmission shaft 44 may include any other suitable kind of gear or mechanical transmission known in the prior art. An upper end of the transmission shaft 44 may include a socket connector 44a. The transmission shaft 44 may be made of an engineering material. Preferably, the motor 43 may be an electric motor. The motor 43 may include a shaft motor 43*a*. The shaft motor 43*a* may be mechanically coupled to the socket connector 44*a* of the transmission shaft 44. The motor 43 may be secured to the support wall 22*a* via the fasteners 24. The motor 43 may be housed by the upper portion 21 of the housing assembly 20. The first bevel gear of the transmission shaft 44 may be connected to a second bevel gear of the propeller shaft 46. It should be understood that the transmission shaft 44 may be connecter to the propeller shaft 46 by any other suitable mechanical means. The propeller shaft 46 may be a rod having the second bevel gear at one distal end and the propeller 48 connected at another distal end. The transmission shaft 44 may transmit torque from the motor 43 to the propeller 48. The motor 43 may be chosen to provide the power required by the propeller 48.

The fuel cell assembly 60 may include fuel cell 62, battery 68, and electronic control unit 65. The fuel cell 62 may be secured to the upper portion 21 of the housing assembly 20 using the cell fasteners 62*a*. The fuel cell 62 may partially cover the motor 43. The fuel cell 62 may have a curved shape defining a semi circle. The fuel cell 62 may have a C-shape. Preferably, the tanks 102 may be mounted onboard the boat. The tanks 102 may be in communication with the fuel cell 62 via the tank pipe 64*a*. The tanks 102 may provide hydrogen to the fuel cell 62. The fuel cell 62 may convert the chemical energy of the hydrogen and an oxidizing agent such as oxygen. The fuel cell 62 may use oxygen from ambient air as input air. The fuel cell 62 may be wired to the motor 43. The fuel cell may provide energy to the motor 43. The fuel cell 62 may be connected to outlet 69. Outlet 69 may expel water and oxygen as waste of the fuel cell 62 reaction. It should be understood that the fuel cell 62 may be any other kind of fuel cell that converts chemical energy from one source of fuel to electricity to power the motor 43. Fuel cell 62 may be any suitable kind of fuel cell known in the prior art. The fuel cell 62 and the battery 68 may be connected to the electronic control unit 65. The electronic control unit 65 may switch between one source of energy to the other to power the motor 43. In one configuration, the electronic control unit 65 may use the energy stored by the battery 68 to start the motor 43. When the motor 43 has started to work, the electronic control unit 65 may switch to provide energy from the fuel cell 62 to the motor 43. The electronic control unit 65 may also provide some energy from the fuel cell 62 to the battery 68 to recharge the battery 68. The electronic control unit 65 may be located atop of the fuel cell 62.

The cooling assembly 80 may include a cooling sleeve 82 and pump 84. The cooling sleeve 82 may have an annular shape. The cooling sleeve 82 may have a bigger diameter than the motor 43. The cooling sleeve 82 may have a hose 81 sinusoidally disposed around the cooling sleeve 82. The hose 81 may be internally or externally mounted to the cooling sleeve 82. The hose 81 may have an inlet 81*a* to be connected to pipe 86. The hose may have outlet 81*b* to be connected to pipe 86*a*. The pipe 86 may have a pump 84 embedded near to an inlet of the pipe 86. The pump 84 may pump water to the cooling sleeve 82 through the pipe 86. The water may travel along the hose 81 to cool down the motor 43 to increase efficiency of the motor 43 and to avoid overheating of the motor 43. The water may be expelled by the pipe 86*a*. The cooling sleeve 82 may cover the motor 43. The fuel cell 62 may cover the cooling sleeve 82.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electric outboard motor, comprising:
    a housing assembly including a housing;
    a propeller assembly including a propeller connected to an electric motor, said motor is enclosed by said housing;
    a fuel cell assembly including a fuel cell, and an electronic control unit, said fuel cell and said electronic control unit are enclosed by said housing, wherein said fuel cell has a curved shape defining a semi circle shaped fuel cell, wherein the fuel cell assembly powers said electric motor, and
    a cooling assembly including a cooling sleeve wherein said cooling sleeve has an annular shape, wherein said cooling sleeve surrounds said motor, wherein said cooling sleeve is surrounded by said fuel cell, wherein said cooling assembly further includes a pump, said pump provides water to the cooling sleeve to cool down a temperature of said motor, wherein said cooling sleeve has a hose sinusoidally disposed therein.

2. The electric outboard motor set forth in claim 1, further including a boat assembly including a fuel tank mounted thereon onboard, said fuel tank has hydrogen, said fuel tank provides hydrogen to the fuel cell.

3. The electric outboard motor set forth in claim 2, wherein said fuel cell converts chemical energy from the hydrogen provided by the fuel tank into electrical energy to power said electric motor.

4. The electric outboard motor set forth in claim 1, wherein said fuel cell assembly further includes a battery to start the electric motor.

5. The electric outboard motor set forth in claim 1, wherein said propeller assembly further includes a transmission shaft and a propeller shaft, said transmission shaft connects the motor to the propeller.

6. The electric outboard motor set forth in claim 5, wherein said transmission shaft and said propeller shaft are connected by bevel gears.

7. An electric outboard motor, comprising:
    a boat assembly including a fuel tank mounted thereon;
    a housing assembly including a housing, said housing assembly is mounted to said boat assembly;
    a propeller assembly including a propeller connected to an electric motor, said motor is enclosed by said housing; and
    a fuel cell assembly including a fuel cell, and an electronic control unit, said fuel cell and said electronic control unit are enclosed by said housing, wherein said fuel cell has a curved shape defining a semi circle shaped fuel cell, wherein the fuel cell assembly powers said electric motor, wherein said fuel cell assembly further includes a battery to start the electric motor; and
    a cooling assembly including a cooling sleeve, wherein said cooling sleeve has an annular shape, wherein said cooling sleeve surrounds said motor, wherein said cooling sleeve is surrounded by said fuel cell, wherein said cooling sleeve has a hose sinusoidally disposed thereon, wherein the cooling assembly further includes a pump and a pipe, said pump is located on a bottom portion of the housing, said pipe is connected to an inlet of the hose of the cooling sleeve, said pump provides water to the cooling sleeve through the pipe.

8. An electric outboard motor, consisting of:
    a boat assembly including a fuel tank mounted thereon;

a housing assembly including a housing, said housing assembly is mounted to said boat assembly;

a propeller assembly including a propeller connected to an electric motor, said motor is enclosed by said housing, wherein said propeller assembly further includes a transmission shaft and a propeller shaft, said transmission shaft connects the motor to the propeller, wherein said transmission shaft and said propeller shaft are connected by bevel gears; and a fuel cell assembly including a fuel cell, and an electronic control unit, said fuel cell and said electronic control unit are enclosed by said housing, wherein said fuel cell has a curved shape defining a semi circle shaped fuel cell, wherein said fuel tank is mounted to an external surface of said housing, said fuel tank has hydrogen, said fuel tank provides hydrogen to the fuel cell, wherein said fuel cell converts chemical energy from the hydrogen provided by the fuel tank into electrical energy to power said electric motor, wherein said fuel cell assembly further includes a battery to start the electric motor, wherein the fuel cell is secured to the housing using cell fasteners; and a cooling assembly including a cooling sleeve, wherein said cooling sleeve has an annular shape, wherein said cooling sleeve surrounds said motor, wherein said cooling sleeve is surrounded by said fuel cell, wherein said cooling assembly further includes a pump and a pipe, said pump is located on a bottom portion of the housing, said pipe is connected to an inlet of the hose of the cooling sleeve, said pump provides water to the cooling sleeve through the pipe to cool down a temperature of said motor, wherein said cooling sleeve has a hose sinusoidally disposed therein.

* * * * *